United States Patent
You et al.

(10) Patent No.: US 8,923,605 B2
(45) Date of Patent: Dec. 30, 2014

(54) METHOD AND SYSTEM FOR DETECTING OBJECT ON A ROAD

(71) Applicants: Ganmei You, Beijing (CN); Yaojie Lu, Beijing (CN); Jichuan Zheng, Beijing (CN)

(72) Inventors: Ganmei You, Beijing (CN); Yaojie Lu, Beijing (CN); Jichuan Zheng, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 183 days.

(21) Appl. No.: 13/673,199

(22) Filed: Nov. 9, 2012

(65) Prior Publication Data

US 2013/0128001 A1     May 23, 2013

(30) Foreign Application Priority Data

Nov. 18, 2011    (CN) .......................... 2011 1 0369183

(51) Int. Cl.
*G06K 9/00*      (2006.01)
*H04N 7/18*      (2006.01)
*H04N 13/02*      (2006.01)

(52) U.S. Cl.
CPC ............ *H04N 7/18* (2013.01); *H04N 13/0203* (2013.01); *G06K 9/00208* (2013.01); *G06K 9/00798* (2013.01); *G06K 9/00805* (2013.01)
USPC ....................................................... 382/154

(58) Field of Classification Search
None
See application file for complete search history.

(56) References Cited

U.S. PATENT DOCUMENTS

| | | | |
|---|---|---|---|
| 7,366,325 B2 | 4/2008 | Fujimura et al. | |
| 7,660,438 B2 | 2/2010 | Camus | |
| 7,680,323 B1 | 3/2010 | Nichani | |
| 7,729,512 B2 | 6/2010 | Nishiyama | |
| 2007/0255480 A1* | 11/2007 | Southall et al. | 701/96 |
| 2011/0115615 A1* | 5/2011 | Luo et al. | 340/436 |
| 2014/0037145 A1* | 2/2014 | Schamp | 382/104 |

OTHER PUBLICATIONS

Soquet, N.; Aubert, D.; Hautiere, N., "Road Segmentation Supervised by an Extended V-Disparity Algorithm for Autonomous Navigation," Intelligent Vehicles Symposium, 2007 IEEE Jun. 13, 2007.*
Zhencheng Hu; Uchimura, K., "U-V-disparity: an efficient algorithm for stereovision based scene analysis," Intelligent Vehicles Symposium, 2005. Proceedings. IEEE, Jun. 6, 2005.*

(Continued)

*Primary Examiner* — Atiba O Fitzpatrick
*Assistant Examiner* — Thomas A James
(74) *Attorney, Agent, or Firm* — Harness, Dickey & Pierce, P.L.C.

(57) ABSTRACT

Disclosed are a method and a system for detecting an object on a road. The method comprises a step of simultaneously capturing two depth maps, and then calculating a disparity map; a step of obtaining, based on the disparity map, a V-disparity image by adopting a V-disparity algorithm; a step of detecting an oblique line in the V-disparity image, and then removing points in the disparity map, corresponding to the oblique line so as to acquire a sub-disparity map excluding the road; a step of detecting plural vertical lines in the V-disparity image, and then extracting, for each of the plural vertical lines, points corresponding to this vertical line from the sub-disparity map as an object sub-disparity map corresponding to this vertical line; and a step of merging any two rectangular areas of the object sub-disparity maps approaching each other, into a rectangular object area.

18 Claims, 11 Drawing Sheets

(56) References Cited

OTHER PUBLICATIONS

Jun Zhao; Katupitiya, J.; Ward, J., "Global Correlation Based Ground Plane Estimation Using V-Disparity Image," Robotics and Automation, 2007 IEEE International Conference on Apr. 10, 2007.*

Wedel, A.; Badino, H.; Rabe, C.; Loose, H.; Franke, U.; Cremers, D., "B-Spline Modeling of Road Surfaces With an Application to Free-Space Estimation," Intelligent Transportation Systems, IEEE Transactions on, vol. 10, No. 4, pp. 572,583, Dec. 2009.*

Le Thanh Sach; Atsuta, K.; Hamamoto, K.; Kondo, S., "A robust road profile estimation method for low texture stereo images," Image Processing (ICIP), 2009 16th IEEE International Conference on Nov. 7, 2009.*

Schreiber, M.; Knoppel, C.; Franke, U., "LaneLoc: Lane marking based localization using highly accurate maps," Intelligent Vehicles Symposium (IV), 2013 IEEE Jun. 23, 2013.*

Chung-Hee Lee; Young-Chul Lim; Soon Kwon; Jong-Hun Lee, "Obstacle localization with a binarized v-disparity map using local maximum frequency values in stereo vision," Signals, Circuits and Systems, 2008. SCS 2008. 2nd International Conference on Nov. 7, 2008.*

Pink, O., "Visual map matching and localization using a global feature map," Computer Vision and Pattern Recognition Workshops, 2008. CVPRW '08. IEEE Computer Society Conference on Jun. 23, 2008.*

Jun Zhao; Whitty, M.; Katupitiya, J., "Detection of non-flat ground surfaces using V-Disparity images," Intelligent Robots and Systems, 2009. IROS 2009. IEEE/RSJ International Conference on Oct. 10, 2009.*

Labayrade, R.; Aubert, D., "A single framework for vehicle roll, pitch, yaw estimation and obstacles detection by stereovision," Intelligent Vehicles Symposium, 2003. Proceedings. IEEE Jun. 9, 2003.*

Hautiere, N.; Labayrade, R.; Aubert, D., "Real-time disparity contrast combination for onboard estimation of the visibility distance," Intelligent Transportation Systems, IEEE Transactions Jun. 2006.*

Suganuma, N.; Shimoyama, M.; Fujiwara, N., "Obstacle detection using Virtual Disparity Image for non-flat road," Intelligent Vehicles Symposium, Jun. 4, 2008.*

Min Zhang; Peizhi Liu; Xiaochuan Zhao; Xinxin Zhao; Yuan Zhang, "An obstacle detection algorithm based on U-V disparity map analysis," Information Theory and Information Security (ICITIS), 2010 IEEE International Conference on Dec. 17, 2010.*

Zhencheng Hu; Jia Wang; Uchimura, K., "Moving Obstacles Extraction with Stereo Global Motion Model," Pattern Recognition, 2006. ICPR 2006.*

Gao, Y.; Wang, Y.; Rarity, J.; Dahnoun, N., "U-V-Disparity based Obstacle Detection with 3D Camera and steerable filter," Intelligent Vehicles Symposium (IV), Jun. 5, 2011.*

Einramhof, P.; Vincze, M., "Stereo-based real-time scene segmentation for a home robot," ELMAR, 2010 Proceedings, Sep. 15, 2010.*

Ben Romdhane, N.; Hammami, M.; Ben-Abdallah, H., "A generic obstacle detection method for collision avoidance," Intelligent Vehicles Symposium (IV), 2011 IEEE, Jun. 5, 2011.*

Chunhui Zheng; Green, R., "Vision-based autonomous navigation in indoor environments," Image and Vision Computing New Zealand (IVCNZ), 2010 25th International Conference of Nov. 8, 2010.*

CheeWay Teoh; ChingSeong Tan; Yong Chai Tan, "Ground plane detection for autonomous vehicle in rainforest terrain," Sustainable Utilization and Development in Engineering and Technology (STUDENT), 2010 IEEE Conference on Nov. 20, 2010.*

Ke Peiqi; Meng Cai; Li Jihao; LiuYing, "Homography-based ground area detection for indoor mobile robot using binocular cameras," Robotics, Automation and Mechatronics (RAM), 2011 IEEE Conference on Sep. 17, 2011.*

Sameera Kodagoda, "Stereo vision for obstacle detection in autonomous vehicle navigation" 2010.*

Zhao, Jun. Stereo Imaging and Obstacle Detection Methods for Vehicle Guidance. Diss. University of New South Wales, Australia, 2008.*

Kormann et al. (2010) "Stereo Vision Based Vehicle Detection", BMW Group Research and Technology, VISIGRAPH 2010.

\* cited by examiner

DISPARITY MAP → V-DISPARITY IMAGE

V-DISPARITY IMAGE → ROAD LINE DETECTOR IN V-DISPARITY IMAGE (OBLIQUE LINE DETECTION) → EXTENDED ROAD LINE IN V-DISPARITY IMAGE (EXTENSION LINE)

OBLIQUE LINE DIVISION

EXTENDED ROAD LINE IN V-DISPARITY IMAGE

SUB-LINE SEGMENTS IN V-DISPARITY IMAGE

OBLIQUE LINE IN V-DISPARITY IMAGE

EXTRACTED ROAD SURFACE IN DISPARITY MAP

DISPARITY MAP

SUB-DISPARITY MAP WITHOUT ROAD SURFACE

METHOD AND SYSTEM FOR DETECTING OBJECT ON A ROAD

BACKGROUND OF THE INVENTION

1. Field of the Invention

The present invention relates to a method and a system for detecting at least one object on a road, more particularly relates to a method and a system used in a vehicle for detecting at least one object on a road.

2. Description of the Related Art

With the development of cities and the popularization of vehicles, the problem of traffic and transportation has become bigger. In recent years, the speed of increase of vehicles has been far higher than that of roads and other traffic facilities. In the meanwhile, traffic accidents occur frequently, the number of injuries has increased, and personal property has been lost dramatically. As a result, a vehicle was required to have not only good safety but also a certain degree of intelligence. In the light of this, the intelligent vehicle concept occurred. At present, research is being performed for achieving an intelligent vehicle able to carry out unattended, fully-automatic, and safe driving.

In order to fulfill the above functions, in the conventional techniques, a method is proposed in which an object approaching a vehicle of a driver (for example, a person or another vehicle) is detected by carrying out a grouping (clustering) process on the basis of a disparity map of a road surface, and then a warning message is reported to the driver, or the movement state of the driver's vehicle is auto-adjusted. In this method, it is assumed that in a three-dimensional (3D) space, points in a same object domain are adjacent to each other, and the grouping process is carried out on the basis of distances and with regard to the whole disparity map. Since the grouping process is conducted on the whole disparity map, and only two frames of results are able to be obtained in one second, the method takes time, and diminishes the efficiency of dealing with an unforeseen accident. However, the method still has practical use.

Furthermore there is also a vehicle detection and recognition system provided by the BMW™ Group Research and Technology (published in "VISIGRAPH 2010"). The system carries out vehicle detection on the basis of stereoscopic vision. In particular, first, vehicles are detected by using segmentation based on a mean shift clustering process; second, vehicle assumptions (candidates) covering the different vehicles are generated by using a U-V disparity algorithm. The processing speed in the system is 2.5 frames per second (obtained in a debug environment of a 3.2 GHz and 1 GB RAM desktop computer). Since the mean shift clustering process is utilized to divide an image, and the U-V disparity algorithm is utilized to seek an object, the system also takes time.

In addition, U.S. Pat. No. 7,729,512 B2 discloses a stereoscopic image processing method of detecting a moving object. In this method, a first image and a second image are obtained by sensing an image of a moving object from two different viewpoints by using a first imaging device and a second imaging device. Plural feature points are detected from the first image. A disparity distribution representing a disparity of each feature point is obtained by performing stereoscopic image processing using the first image and the second image. A threshold is determined for disparities in the disparity distribution. A feature point having a disparity exceeding the threshold in the disparity distribution is classified as an intra-moving-object feature point. An image area of the moving object in the first image is detected by using the intra-moving-object feature point. The method adopts a clustering approach, but the object detection based on brightness, used in the clustering approach is unreliable since a moving object having brightness being virtually the same with that of the surrounding environment cannot be detected in general. Particularly in a case where the disparity of an object is virtually the same with that of an adjacent roadside tree, the method cannot detect the object having the disparity being virtually the same with the disparity of the tree.

As a result, a method and a system able to rapidly and accurately detect at least one object on the surface of a road needs to be proposed so that it is possible to more effectively achieve the driving assistance of a vehicle, and to report a warning message before an accident, so as to improve the driving safety.

SUMMARY OF THE INVENTION

In order to be able to rapidly and accurately detect at least one object on the surface of a road (also called a "road surface object"), a method and a system for detecting the object on the basis of both the disparities of the road surface scene and a V-disparity image are provided in the embodiments of the present invention.

In particular, auto-detection of at least one obstacle in front of a vehicle is carried out by utilizing an object recognition technique on the basis of binocular vision. For this purpose, an algorithm called a "V-disparity algorithm" is introduced here. The V-disparity algorithm may simplify a division process of an obstacle and a road surface. In a V-disparity image, V corresponds to the vertical coordinates in the image coordinate system of a disparity map. In a V-disparity domain, a longitudinal section of a road surface may be described as a piecewise linear curve, and an obstacle in a vertical plane may be projected as a vertical line. As a result, an extraction of a road surface and an obstacle in a 3D disparity map may be simplified as a 2D (two-dimensional) liner extraction in a V-disparity image. In this way, it is possible to recognize an obstacle in front of a vehicle, having a surface feature, for example, a passer-by, another vehicle, or a wall. In addition, this kind of algorithm is not sensitive to interference such as lighting, shadows, or the like; consequently the algorithm is suitable for obstacle recognition for an intelligent vehicle, under a complex background. In particular, a V-disparity recognition process based on the two eyes of a human being mainly comprises three contents, namely, creating a V-disparity image, extracting a road surface, and extracting at least one vertical line representing an object on the road surface.

According to one aspect of the present invention, there is provided a method of detecting at least one object on a road. The method comprises a step of simultaneously capturing two depth maps of a current scene by adopting two depth cameras, and then calculating a disparity map of the current scene based on the two depth maps; a step of obtaining, based on the disparity map, a V-disparity image of the current scene by adopting a V-disparity algorithm; a step of detecting an oblique line in the V-disparity image, corresponding to the road in the disparity map, and then removing all of the points in the disparity map, corresponding to the oblique line detected in the V-disparity image, so as to acquire a sub-disparity map excluding the road; a step of detecting plural vertical lines in the V-disparity image, and then extracting, for each of the plural vertical lines, all of the points corresponding to this vertical line from the sub-disparity map excluding the road, to serve as an object sub-disparity map corresponding to this vertical line; and a step of merging any two rectangular areas of the object sub-disparity maps, whose disparity distance is less than a predetermined distance value and whose overlap rate is greater than a predetermined threshold value, into a rectangular object area.

Furthermore, in the method, a Hough transform is utilized for detecting the oblique line in the V-disparity image, corresponding to the road in the disparity map.

Moreover, in the method, detecting each of the plural vertical lines in the V-disparity image is conducted by seeking continuous points having a same gray level not equal to zero, in the V-disparity image.

In addition, in the method, detecting the oblique line in the V-disparity image, corresponding to the road in the disparity map, and then removing all of the points in the disparity map, corresponding to the oblique line detected in the V-disparity image includes a step of detecting the oblique line in the V-disparity image by adopting the Hough transform; a step of extending the oblique line so as to let it intersect with horizontal and vertical coordinate axes of the V-disparity image, respectively; a step of dividing, based on horizontal coordinate values of the oblique line, the oblique line into plural sub-line segments; and a step of removing, for each of the plural sub-line segments, all of the points in the disparity map, corresponding to this sub-line segment, wherein, all of the points are within a corresponding disparity range.

Also the method further comprises, before carrying out the merging step, a step of performing a point clustering process with regard to each of the object sub-disparity maps.

Additionally the method further comprises, before carrying out the point clustering process, a step of, for each of the object sub-disparity maps, conducting a smoothing process with regard to all of the points forming this object sub-disparity map, and then removing connection points in this object sub-disparity map.

According to another aspect of the present invention, there is provided a system for detecting at least one object on a road. The system comprises two depth cameras configured to simultaneously capture two depth maps of a current scene so as to calculate a disparity map of the current scene based on the two depth maps; a V-disparity map calculator configured to obtain, based on the disparity map, a V-disparity image of the current scene by adopting a V-disparity algorithm; a road extractor configured to detect an oblique line in the V-disparity image, corresponding to the road in the disparity map, and then to remove all of the points in the disparity map, corresponding to the oblique line detected in the V-disparity image, so as to acquire a sub-disparity map excluding the road; an object area detector configured to detect plural vertical lines in the V-disparity image, and then to extract, for each of the plural vertical lines, all of the points corresponding to this vertical line from the sub-disparity map excluding the road, to serve as an object sub-disparity map corresponding to this vertical line; and an object area merging unit configured to merge any two rectangular areas of the object sub-disparity maps, whose disparity distance is less than a predetermined distance value and whose overlap rate is greater than a predetermined threshold value, into a rectangular object area.

Moreover, in the system, the object area detector detects each of the plural vertical lines in the V-disparity image by seeking continuous points having a same gray level not equal to 0, in the V-disparity image.

In addition, in the system, the road extractor detects the oblique line in the V-disparity image, corresponding to the road in the disparity map, and then removes all of the points in the disparity map, corresponding to the oblique line detected in the V-disparity image by carrying out a step of detecting the oblique line in the V-disparity image by adopting Hough transform; a step of extending the oblique line so as to let it intersect with horizontal and vertical coordinate axes of the V-disparity image, respectively; a step of dividing, based on horizontal coordinate values of the oblique line, the oblique line into plural sub-line segments; and a step of removing, for each of the plural sub-line segments, all of the points in the disparity map, corresponding to this sub-line segment, wherein, all of the points are within a corresponding disparity range.

Also the system further comprises a noise processor configured to, for each of the object sub-disparity maps, conduct a smoothing process with regard to all of the points forming this object sub-disparity map, and then to remove connection points in this object sub-disparity map; and a point clustering processor configured to perform a point clustering process with regard to each of the object sub-disparity maps after processed by the noise processor.

According to the above described method and system, it is possible to achieve a processing speed of 17 frames per second; as a result, the processing speed in the method and system is greater than those of the conventional techniques. Furthermore, in the method and system, a V-disparity image is adopted for seeking an object sub-disparity map including an object, and then the object is detected from the object sub-disparity map by using a simple clustering approach; as a result, this may significantly increase the detection accuracy. In addition, the method and system are based on disparity data and a V-disparity image, but are not based on brightness data; therefore it is possible to clearly distinguish various objects having a same brightness value.

DETAILED DESCRIPTION OF THE PREFERRED EMBODIMENTS

The aim of the present invention is to provide a method and a system for detecting at least one object on a road, to enable to be helpful to achieve safe driving.

Hereinafter, embodiments of the present invention will be concretely described with reference to the drawings. However it should be noted that the same symbols, which are in the specification and the drawings, stand for constructional elements having basically the same function and structure, and repeated explanations for the constructional elements are omitted.

Figure 1:
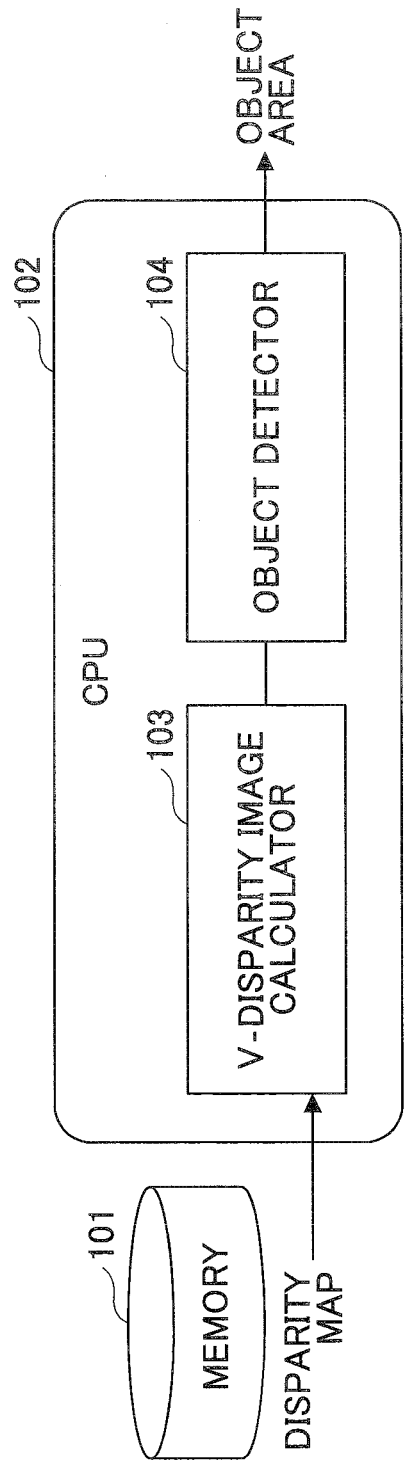
FIG. 1 is a basic block diagram of a system for detecting at least one object on a road, according to an embodiment of the present invention.

FIG. 1 is a basic block diagram of a system according to an embodiment of the present invention; the system adopts a method of detecting at least one object on a road.

As shown in FIG. 1, the method is fulfilled basically in a CPU 102; of course, it may also be achieved among plural modules independent of each other or connected to each other. The system in this embodiment comprises a memory 101 and the CPU 102. The CPU 102 includes a V-disparity image calculator 103 and an object detector 104. In the memory 101, a disparity map (an original disparity map) is stored. The disparity map is obtained on the basis of two depth maps of a same scene, simultaneously captured by two depth cameras disposed in parallel.

Figure 6:
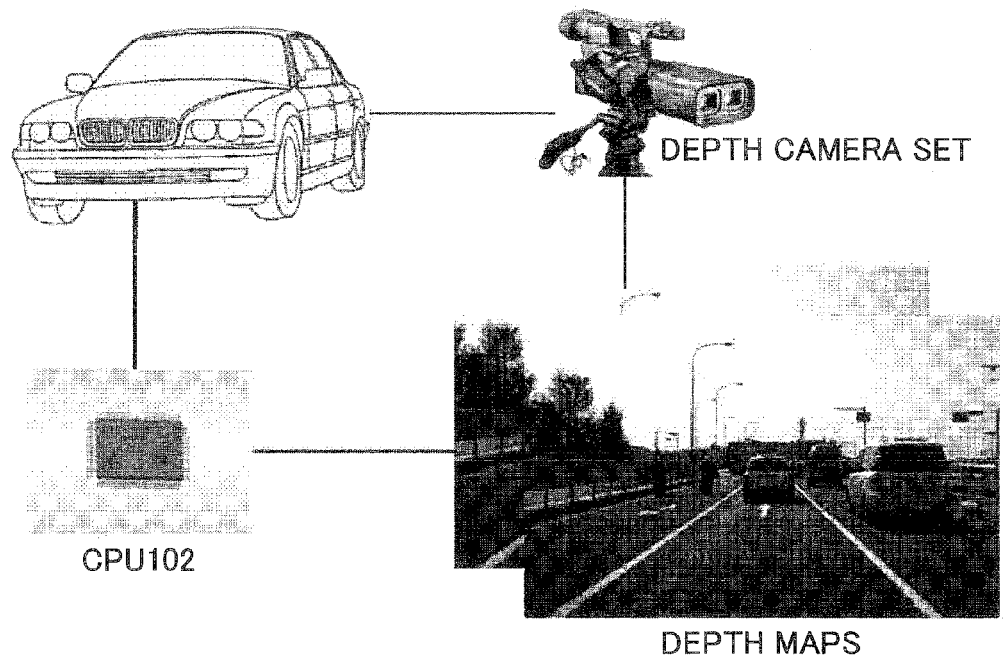
FIG. 6 illustrates an example of an environment adopting a method and a system according to embodiments of the present invention.

FIG. 6 illustrates an example of an environment in which a method and a system according to embodiments of the present invention are adopted.

As shown in FIG. 6, in this example, there is a vehicle in which two depth cameras (forming a depth camera set) are disposed in parallel. The two depth cameras disposed in parallel are like the two eyes of a human being, and may capture two depth maps of the same scene (a current scene) in front of them at the same time. The two cameras may be the same. The captured two depth maps may be directly processed by a processor inside the depth camera set so as to generate a disparity map of the current scene, and then the disparity map may be output to and stored in the memory 101. Alternatively the captured two depth maps may be transmitted to the CPU 102 so as to let the CPU 102 carry out a proper process to obtain a disparity map of the current scene, and then the disparity map is output to and stored in the memory 101.

Figure 7:
FIG. 7 illustrates an example of a disparity map.

FIG. 7 illustrates an example of a disparity map.

Here it should be noted that how to obtain a disparity map is well-known to those people skilled in the art; as a result, the concrete description of how to obtain a disparity map is omitted.

The V-disparity image calculator 103 conducts, based on the disparity map read from the memory 101, a V-disparity calculating process so as to acquire a V-disparity image corresponding to the disparity map. The height of the V-disparity image is equal to that of the disparity map, and the width is equal to the maximum disparity value. For each line 1 of the disparity map, by calculating the number of points having a same disparity value v, a point p in the V-disparity image may be obtained (here the horizontal coordinate value of p is v, the vertical coordinate value is 1, and the strength value is n).

Figure 8:
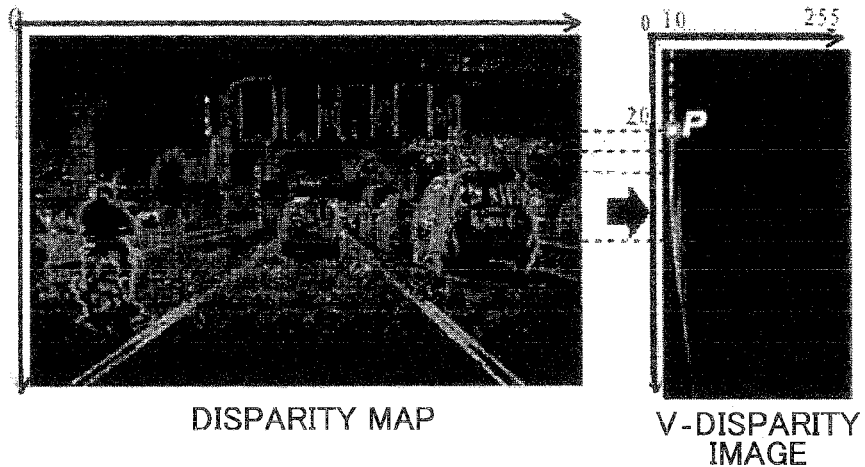
FIG. 8 illustrates an example of calculating a V-disparity image by a V-disparity image calculator 103 shown in FIG. 1 on the basis of a disparity map.

FIG. 8 illustrates an example of calculating a V-disparity image by the V-disparity image calculator 103 shown in FIG. 1 on the basis of a disparity map.

As shown in FIG. 8, for each line of the disparity map, a point P of the V-disparity image may be obtained by calculating the number of points having a same gray level in the corresponding line. In the coordinate system of the obtained V-disparity image, the horizontal coordinate value x stands for the gray value of the point P; that is, the points having a same gray level, in a same line of the disparity map are represented by the point P in the V-disparity image, and the horizontal coordinate value of the point P is the corresponding gray level of the disparity map. In the coordinate system of the obtained V-disparity image, the vertical coordinate value of the point P corresponds to the same line in the disparity map, including the points having the same gray level. The strength value of the point P in the V-disparity image stands for the number of the points having the same gray level, in the same line of the disparity map. As for a road surface, since the depth values of various points in a same line on the road surface in a disparity map are the same, i.e., since there is a same gray level in a same line in the disparity map, in a V-disparity image obtained after V-disparity calculation, a point (for example, the point P) represents various points in the same line on the road surface in the disparity map. In general, in a disparity map, a depth value (i.e., the gray levels) of a road surface is inversely proportional to the number of lines; as a result, in a corresponding V-disparity image, a graphic formed by the points representing the road surface must be an oblique line.

The object detector 104 detects, based on the V-disparity image output from the V-disparity image calculator 103, at least one specific object.

Figure 2:
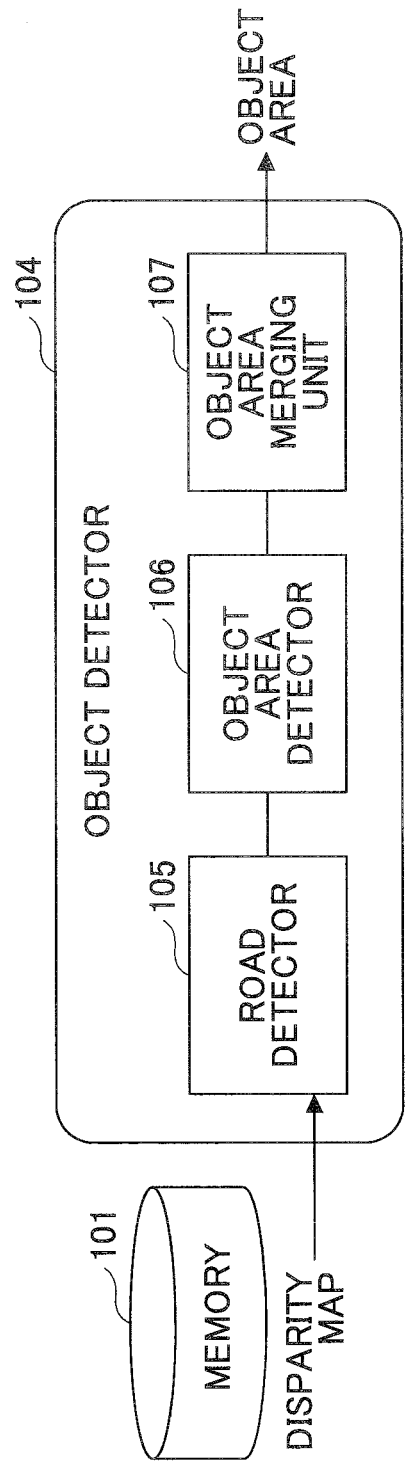
FIG. 2 is a block diagram of an object detector 104 shown in FIG. 1.

FIG. 2 is a block diagram of the object detector 104 shown in FIG. 1.

The object detector 104 includes a road detector 105, an object area detector 106, and an object area merging unit 107.

The road detector 105 detects an oblique line in the V-disparity image, corresponding to a road. Here it should be noted that sometimes the oblique line corresponding to the road is called a "road line". For each point in the oblique line, all of the points corresponding to this point (in the oblique line), in a same line of the disparity map within a range determined on the basis of the horizontal coordinate value of this point in the oblique line, are removed. In this way, finally a sub-disparity map (another original disparity map) excluding the road is obtained.

Figure 3:
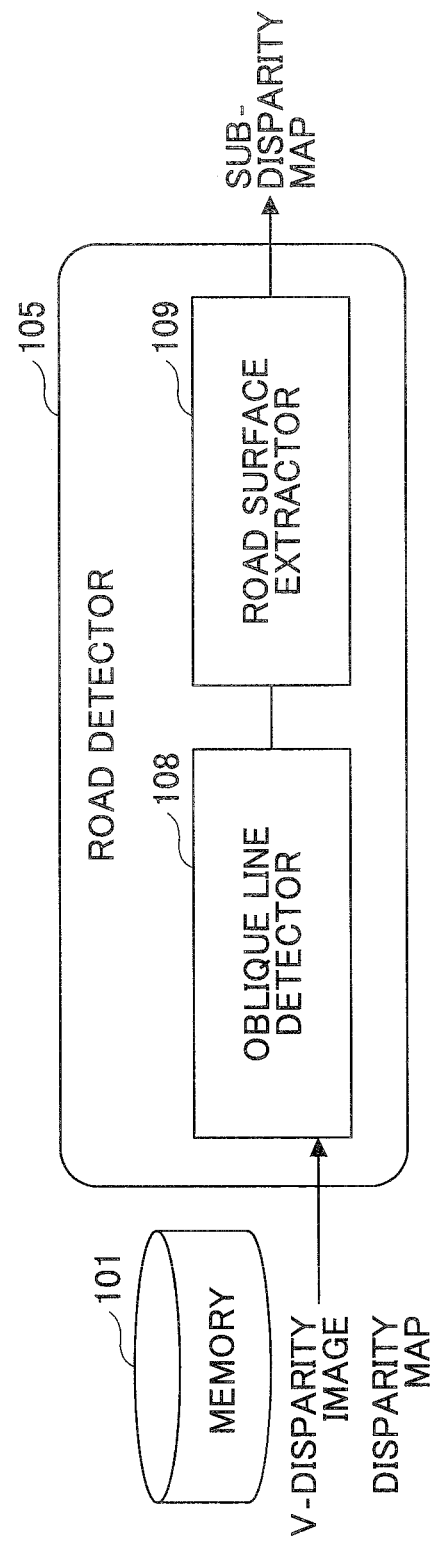
FIG. 3 is a block diagram of a road detector 105 shown in FIG. 2.

FIG. 3 is a block diagram of the road detector 105 shown in FIG. 2.

As shown in FIG. 3, the road detector 105 includes an oblique line detector 108 and a road surface extractor 109. First, the oblique line detector 108 seeks (detects) the oblique line representing the road. In general, the Hough transform is utilized for seeking the oblique line in the V-disparity image. The sought oblique line is extended so as to intersect with the x-axis and the y-axis, respectively.

Figure 9:
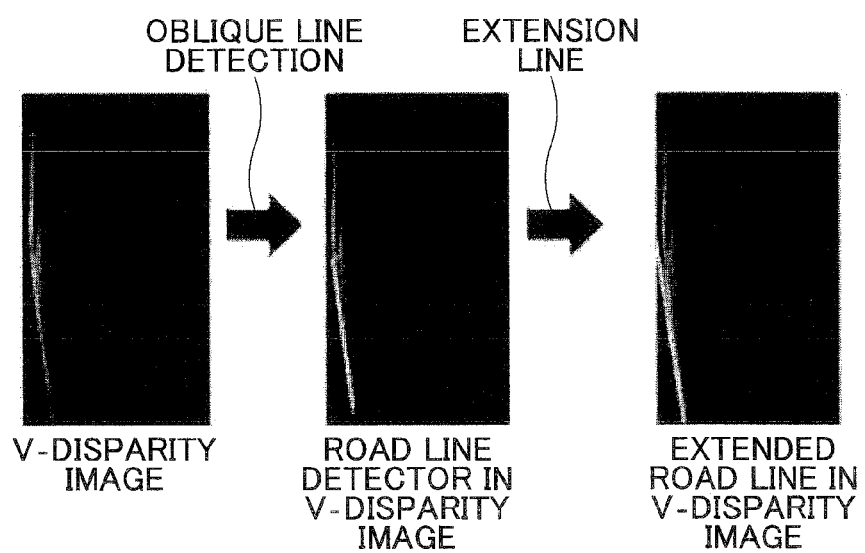
FIG. 9 illustrates an example of seeking an oblique line in a V-disparity image.

FIG. 9 illustrates an example of seeking an oblique line in a V-disparity image.

After the oblique line representing the road is sought in the V-disparity image, the sought oblique line is extended so as to intersect with the horizontal and vertical axes of the V-disparity image, respectively. After that, the road surface extractor 109 recovers (generates), based on the extended oblique line, the points in the disparity map, corresponding to various points on the oblique line. These recovered points are those on the road surface in the disparity map. After the road surface in the disparity is recovered, by subtracting the road surface corresponding to the sought oblique line from the original disparity map, the road surface may be extracted from the original disparity map.

Actually the road surface is not entirely vertical to the depth cameras (i.e., for example, in FIG. 7, the direction of the road surface is not entirely vertical to the bottom side); as a result, an obtained depth value may have an error. For that, in general, before carrying out the road surface extraction, the oblique line may be divided on the basis of the disparities (i.e., the x-axis coordinate values in the V-disparity image, namely, the gray levels or the depth values of the points in the disparity map, corresponding to the points on the oblique line so as to more accurately determine the road surface. In particular, the oblique line is divided into plural sub-line segments on the basis of the x-axis coordinate values in the V-disparity image. Since the road is continuous, as for different sub-line segments, different disparity ranges may be adopted to extract the road surface. Here it should be noted that if a distance dc from the depth camera set is greater than 20 meters, then a same disparity value D (its unit is in pixels) is adopted; if the distance dc is equal to or greater than 10 meters and is less than 20 meters, then the disparity range is [D, D−1]; and if the distance dc is less than 10 meters, then the disparity range is [D, D−2].

The disparity value D may be defined by the following equations (1).

$$D = f*T/(dc+f) \quad (1)$$

Here, f refers to the focal length of any one of the two depth cameras or the average focal length of the two depth cameras; T refers to the distance between the two depth cameras (for example, 0~50 cm); and dc refers to the distance from the depth camera set.

If the distance dc from the depth camera set is 10 meters, then the corresponding disparity calculated by using the above equation (1) is 27; if the distance dc is 20 meters, then the corresponding disparity is 15. As a result, the following equation (2) may be obtained.

$$\text{Disparity Range} = \begin{cases} (D, D-2) & \text{if } D \geq 27 \\ (D, D-1) & \text{if } 15 \leq D < 27 \\ D & \text{if } D < 15 \end{cases} \quad (2)$$

Here D refers to a disparity value, and its unit is in pixels.

Figure 10:
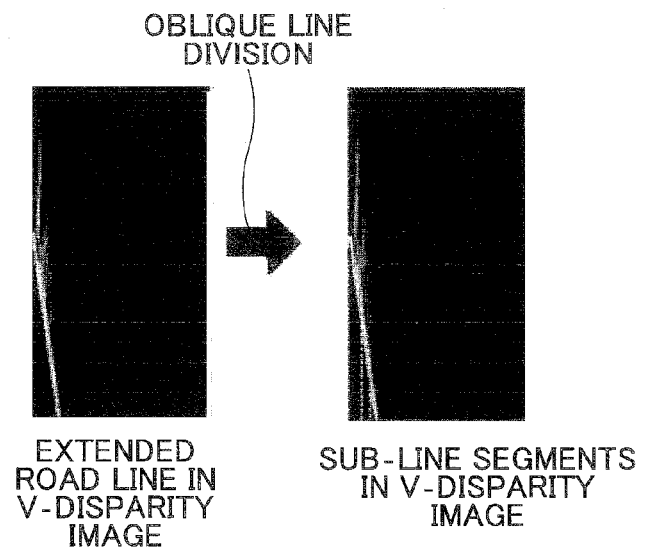
FIG. 10 illustrates an example of dividing an oblique line into plural sub-line segments in a V-disparity image.

FIG. 10 illustrates an example of dividing an oblique line in a V-disparity image.

The road surface extractor 109 extracts the road surface in the disparity map on the basis of the divided sub-line segments. For each point on the oblique line in the V-disparity image, the points corresponding to this point on the oblique line within the disparity range, on a same line in the disparity map may be sought; these kinds of points in the disparity map are the road surface points.

Figure 11:
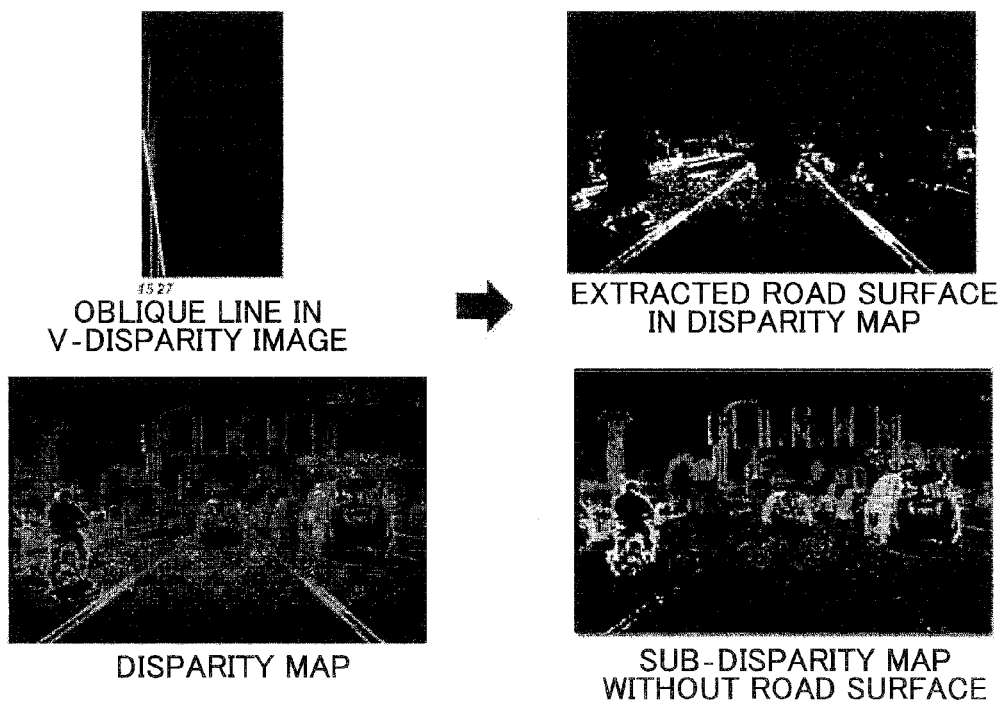
FIG. 11 illustrates an example of extracting a road surface from a disparity map.

FIG. 11 illustrates an example of extracting a road surface from a disparity map.

In particular, first, by utilizing the oblique line divided into the plural sub-line segments, a road surface disparity map corresponding to the oblique line is obtained; second, by subtracting the obtained road surface disparity map from the original disparity map, a sub-disparity map only including at least one object on the road surface is obtained.

After the road surface extraction, the road surface extractor 109 outputs the sub-disparity map including the object into the object area detector 106. The object area detector 106 extracts, based on the feature of the specific object in the disparity map, at least one candidate object from the sub-disparity map output from the road surface extractor 109.

Figure 4:
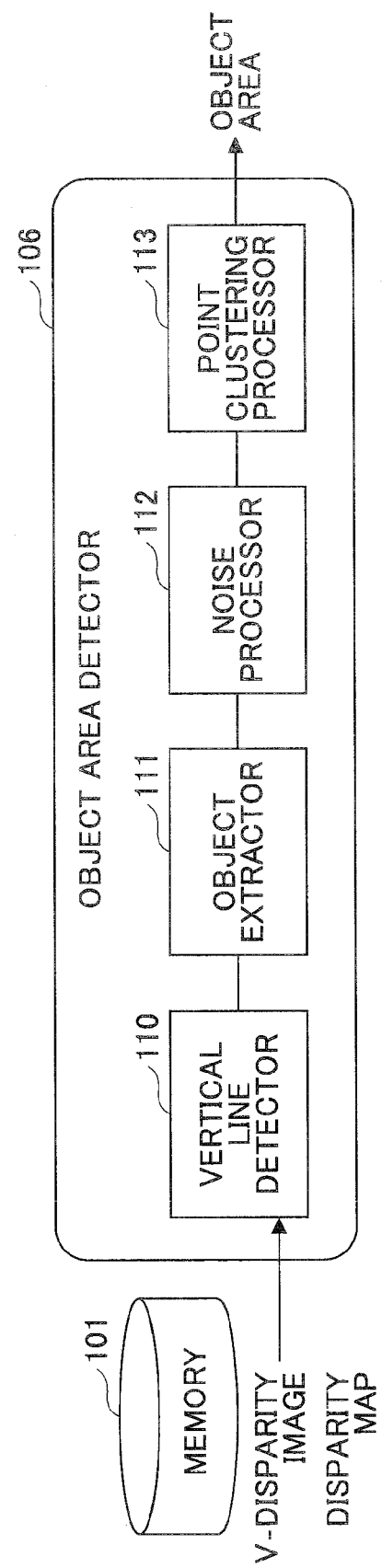
FIG. 4 is a block diagram of an object area detector 106 shown in FIG. 2.

FIG. 4 is a block diagram of the object area detector 106 shown in FIG. 2.

As shown in FIG. 4, the object area detector 106 includes a vertical line detector 110, an object extractor 111, a noise processor 112, and a point clustering processor 113.

The vertical line detector 110 detects each vertical line in the V-disparity image. In general, in a V-disparity image, each vertical line may corresponds to an object. In particular, in the V-display image, continuous points having a same gray level (a same x-axis coordinate value) not equal to zero are sought. A line formed by these kinds of continuous points may be a possible object.

The object extractor 111 seeks (detects), for each vertical line detected and output by the vertical line detector 110, plural points corresponding to this vertical line, in the sub-disparity map output from the road surface extractor 109, and the detected plural points in the sub-disparity map make up a disparity map of an object in the sub-disparity map (also called an "object sub-disparity map"). After that, the object extractor 111 extracts each object sub-disparity map from the sub-disparity map, and outputs it to the noise processor 112.

Figure 12:
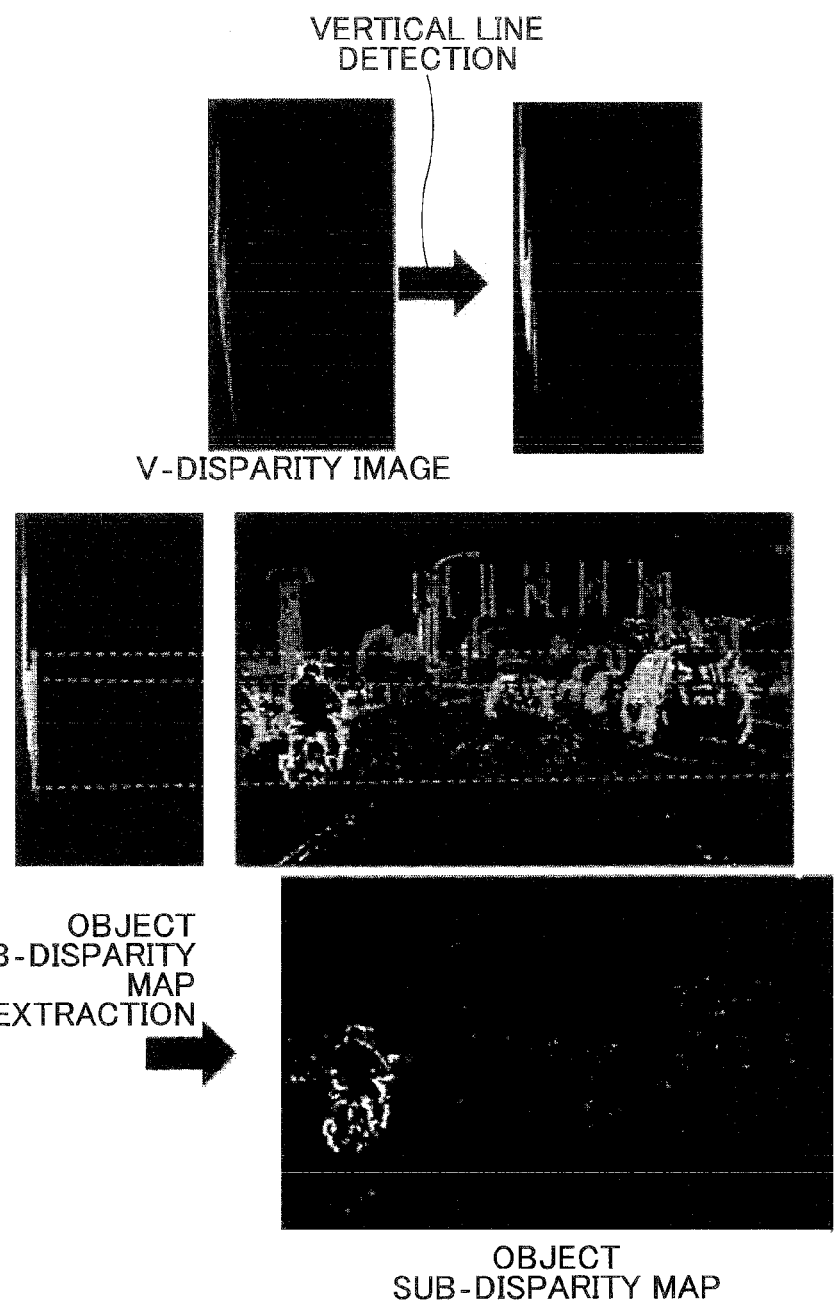
FIG. 12 illustrates an example of extracting an object sub-disparity map.

FIG. 12 illustrates an example of extracting an object sub-disparity map.

In FIG. 12, an object sub-disparity map is shown in which the disparity value D=27; this is a typical object sub-disparity map.

In the process of extracting each object sub-disparity map possibly including an object, for each point on each vertical line in the V-disparity image, if the disparity value of this point is D, then all of the points on a same line in the sub-disparity map, within a disparity range of (D, D+δ) are sought, and these points may be those belonging to the object. According to the disparity values (i.e., the strength values or gray values of the points in the disparity map), the value of δ may be defined by the following equation (3).

$$\delta = \begin{cases} 2 & \text{if } D \geq 20 \\ 0 & \text{otherwise} \end{cases} \quad (3)$$

According the equation (3), if a disparity value D is greater than or equal to 20, then the value of δ is 2; if the disparity D is less than 20, then the value of δ is 0. As a result, when inversely mapping a point on a vertical line in the V-disparity image to points on a same line in the disparity map, if D is greater than or equal to 20, then the points on the same line in the disparity map are those having the strength values (or gray levels) within (D, D+δ); otherwise, the points on the same line in the disparity map are those only corresponding to the disparity D.

After that, the noise processor 112 carries out a smoothing process with regard to each object sub-disparity map output from the object extractor 111, and then removes connection points in each object sub-disparity map. As for the smoothing process, since it is a well-known technique in the art, its concrete description is omitted. Those people skilled in the art may select a proper smoothing approach according to actual needs. Here a median filtering approach is adopted for performing the smoothing process. This kind of smoothing process includes a step of obtaining an odd number of data (gray levels) from a sampling window on the object sub-disparity map, and ranking them; and a step of using the ranked median value to replace the gray levels of all of the points in the sampling window.

Figure 13:
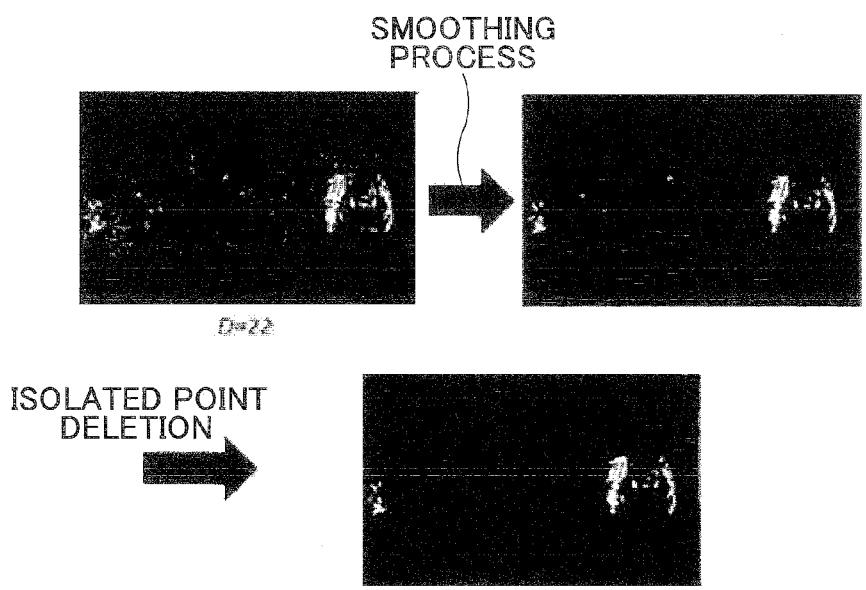
FIG. 13 illustrates an example of carrying out a smoothing process with regard to an object sub-disparity map.

FIG. 13 illustrates an example of carrying out a smoothing process with regard to an object sub-disparity map.

Then the point clustering processor 113 conducts a point clustering process with regard to each object sub-disparity map.

Figure 14:
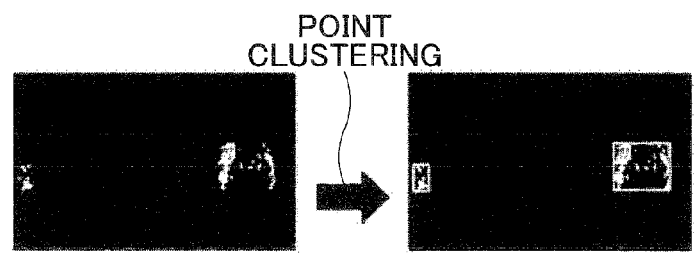
FIG. 14 illustrates an example of performing a point clustering process with regard to an object sub-disparity map.

FIG. 14 illustrates an example of performing a point clustering process with regard to an object sub-disparity map.

In FIG. 14, for each rectangle, the point clustering process is carried out with regard to relatively continuous points. In particular, the point clustering process is performed on the basis of the distances along the x-axis and y-axis in the object sub-disparity map. For each rectangle, relatively continuous points are clustered; for example, as for any two points C1 and C2, if their distance along the x-axis is equal to or less than 2, and their distance along the y-axis is also equal to or less than 2, then the two points C1 and C2 belong to a same class C. As for any other point C3, if the distance between C3 and C1 (or C2) along the x-axis is equal to and less than 2, and the distance between C3 and C1 (or C2) along the y-axis is also equal to or less than 2, then the other point C3 belongs to the same class C; otherwise, a new class is generated on the basis of the point C3, and the point C3 is included in the generated new class. After the point clustering process, the point clustering processor 113 outputs the respective rectangular object areas including objects.

Finally the object area merging unit 107 conducts a merging process with regard to the respective rectangle object areas output by the point clustering processor 113 so as to output at least one merged object area.

Any two rectangular object areas, whose overlap rate is greater than a predetermined threshold value and whose disparity distance is less than a predetermined distance value, are merged as a merged object area, and then the merged object area is output. In other words, an overlap area value and a disparity distance are employed to merge two rectangular object areas. In particular, it is assumed that there are two rectangular object areas (i.e., two rectangles) (x0, y0, w0, h0) and (x1, y1, w1, h1). Here (x0, y0) and (x1, y1) refer to the coordinate values of the top-left corner points of the two rectangles, respectively; w0 and w1 refer to the width values of the two rectangles, respectively; and h0 and h1 refer to the height values of two rectangles, respectively. If the absolute value of the difference vale between two distances from the two rectangles to the corresponding two depth cameras is less than a first predetermined value (for example, 3 meters; also 0.5, 1, 1.5, or 2 meters), then the overlap area value of the two rectangles needs to be calculated. If the ratio of the overlap area value of the two rectangles to the area value of the smaller one of the two rectangles is greater than a second predetermined value (for example, 0.65, 0.7, or 0.75), then these two rectangles need to be merged. That is, the merged object area is (min(x0, x1), min(y0, y1), max(w0, w1), max (h0, h1)) in which min( ) refers to calculating the minimum value, and max( ) refers to calculating the maximum value.

Figure 15:
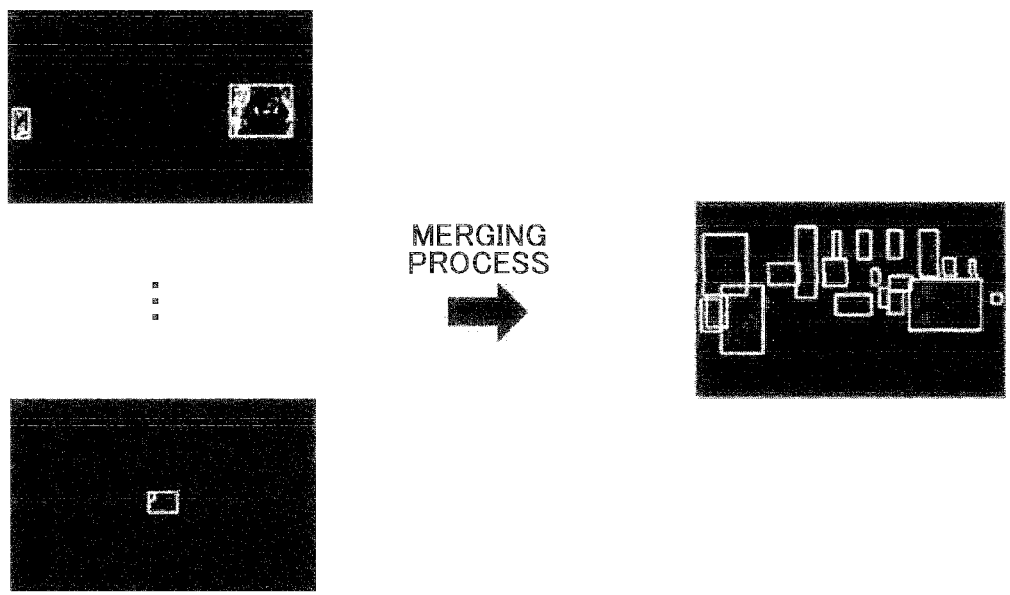
FIG. 15 illustrates an example of merging rectangular object areas.

FIG. 15 illustrates an example of merging rectangular object areas.

In what follows, a method of detecting at least one object on a road, according to an embodiment of the present invention is concretely illustrated.

Figure 5:
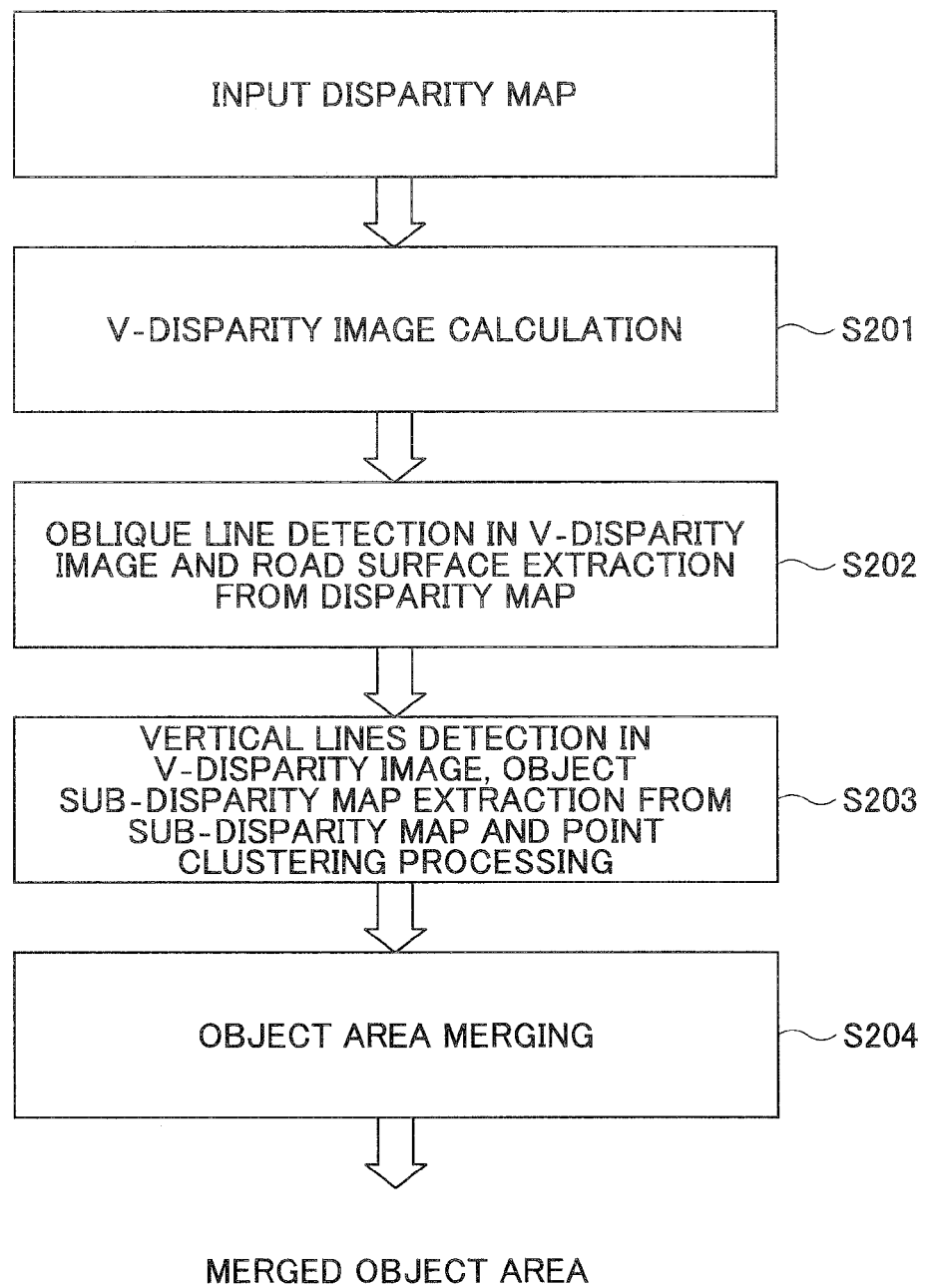
FIG. 5 is a flowchart of a method of detecting at least one object on a road, according to an embodiment of the present invention.

FIG. 5 is a flowchart of the method in this embodiment.

As shown in FIG. 5, in STEP S201, the V-disparity image calculator 103 carries out, based on a disparity map (an original disparity map) read from the memory 101, a V-disparity calculation process so as to obtain a V-disparity image. Then, in STEP S202, the road detector 105 in the object detector 104 detects a road in the V-disparity image, and subtracts a disparity map corresponding to the road detected in the V-disparity image from the original disparity map so as to obtain a sub-disparity map (another original sub-disparity map excluding the road). After that, in STEP S203, the object area detector 106 in the object detector 104 extracts, based on a feature of at least one specific object in the original disparity map, at least one object candidate from the sub-disparity map output from the road surface extractor 109 in the road detector 105, and then performs a point clustering process. At last, in STEP S204, the object merging unit 107 conducts a merging process with regard to rectangular object areas output from the object area detector 106, and outputs at least one emerged object area.

The above method may be executed in a computer (a processor), or may be distributedly executed among plural computers. In addition, a program able to achieve the method may be stored in a non-transitory computer (machine) readable medium, or may be transmitted to a remote computer for purpose of execution.

While the method and the system for detecting at least one object on a road surface are described with reference to the specific embodiments chosen for purpose of illustration, it should be apparent that the present invention is not limited to these embodiments, but numerous modifications could be made thereto by those people skilled in the art without departing from the basic concept and technical scope of the present invention.

The present application is based on Chinese Priority Patent Application No. 201110369183.0 filed on Nov. 18, 2011, the entire contents of which are hereby incorporated by reference.

What is claimed is:

1. A method of detecting at least one object on a road, comprising:
    simultaneously capturing two depth maps of a current scene by adopting two depth cameras, and then calculating a disparity map of the current scene based on the two depth maps;
    obtaining, based on the disparity map, a V-disparity image of the current scene by adopting a V-disparity algorithm;
    detecting an oblique line in the V-disparity image, corresponding to the road in the disparity map, and then removing all of the points in the disparity map, corresponding to the oblique line detected in the V-disparity image, so as to acquire a sub-disparity map excluding the road;
    detecting plural vertical lines in the V-disparity image, and then extracting, for each of the plural vertical lines, all of the points corresponding to this the vertical line from the sub-disparity map excluding the road, to serve as an object sub-disparity map corresponding to the vertical line; and
    merging any two rectangular areas of the object sub-disparity maps, whose disparity distance is less than a distance value and whose overlap rate is greater than a threshold value, into a rectangular object area.

2. The method according to claim 1, wherein:
    a Hough transform is utilized for detecting the oblique line in the V-disparity image, corresponding to the road in the disparity map.

3. The method according to claim 1, wherein:
    detecting each of the plural vertical lines in the V-disparity image is conducted by seeking continuous points having a same gray level not equal to zero, in the V-disparity image.

4. The method according to claim 1, wherein, detecting the oblique line in the V-disparity image, corresponding to the road in the disparity map, and then removing all of the points in the disparity map, corresponding to the oblique line detected in the V-disparity image includes:
    detecting the oblique line in the V-disparity image by adopting a Hough transform;
    extending the oblique line so as to let it intersect with horizontal and vertical coordinate axes of the V-disparity image, respectively;

dividing, based on horizontal coordinate values of the oblique line, the oblique line into plural sub-line segments; and removing, for each of the plural sub-line segments, all of the points in the disparity map, corresponding to the sub-line segment, wherein, all of the points are within a corresponding disparity range.

5. The method according to claim 1, further comprising:
performing, before carrying out the merging step, a point clustering process with regard to each of the object sub-disparity maps.

6. The method according to claim 5, further comprising:
before carrying out the point clustering process, for each of the object sub-disparity maps, conducting a smoothing process with regard to all of the points forming the object sub-disparity map, and then removing connection points in the object sub-disparity map.

7. A system for detecting at least one object on a road, comprising:
two depth cameras configured to simultaneously capture two depth maps of a current scene so as to calculate a disparity map of the current scene based on the two depth maps;
a V-disparity map calculator configured to obtain, based on the disparity map, a V-disparity image of the current scene by adopting a V-disparity algorithm;
a road extractor configured to detect an oblique line in the V-disparity image, corresponding to the road in the disparity map, and then to remove all of the points in the disparity map, corresponding to the oblique line detected in the V-disparity image, so as to acquire a sub-disparity map excluding the road;
an object area detector configured to detect plural vertical lines in the V-disparity image, and then to extract, for each of the plural vertical lines, all of the points corresponding to the vertical line from the sub-disparity map excluding the road, to serve as an object sub-disparity map corresponding to the vertical line; and
an object area merging unit configured to merge any two rectangular areas of the object sub-disparity maps, whose disparity distance is less than a distance value and whose overlap rate is greater than a threshold value, into a rectangular object area.

8. The system according to claim 7, wherein:
the object area detector is configured to detect each of the plural vertical lines in the V-disparity image by seeking continuous points having a same gray level not equal to 0, in the V-disparity image.

9. The system according to claim 7, wherein, the road extractor is configured to detect the oblique line in the V-disparity image, corresponding to the road in the disparity map, and then remove all of the points in the disparity map, corresponding to the oblique line detected in the V-disparity image by:
detecting the oblique line in the V-disparity image by adopting a Hough transform;
extending the oblique line so as to let it intersect with horizontal and vertical coordinate axes of the V-disparity image, respectively;
dividing, based on horizontal coordinate values of the oblique line, the oblique line into plural sub-line segments; and
removing, for each of the plural sub-line segments, all of the points in the disparity map, corresponding to the sub-line segment, wherein, all of the points are within a corresponding disparity range.

10. The system according to claim 7, further comprising:
a noise processor configured to, for each of the object sub-disparity maps, conduct a smoothing process with regard to all of the points forming the object sub-disparity map, and then to remove connection points in the object sub-disparity map; and
a point clustering processor configured to perform a point clustering process with regard to each of the object sub-disparity maps after processed by the noise processor.

11. The method of claim 1, wherein the merged rectangular object area is based on minimum coordinate values and maximum width and height values of the two rectangular areas.

12. The method of claim 1, wherein the removing all of the points in the disparity map is based on a disparity range associated with the points.

13. The method of claim 12, wherein the disparity range is associated with a plurality of disparity values, the disparity values being based on a focal length of one of the two depth cameras and a distance between the two depth cameras.

14. The method of claim 6, wherein the smoothing process is a median filtering method.

15. The system of claim 7, wherein the merged rectangular object area is based on minimum coordinate values and maximum width and height values of the two rectangular areas.

16. The system of claim 7, wherein the removing all of the points in the disparity map is based on a disparity range associated with the points.

17. The system of claim 16, wherein the disparity range is associated with a plurality of disparity values, the disparity values being based on a focal length of one of the two depth cameras and a distance between the two depth cameras.

18. The system of claim 10, wherein the smoothing process is a median filtering method.

* * * * *